(12) United States Patent
Lee

(10) Patent No.: US 11,767,924 B1
(45) Date of Patent: Sep. 26, 2023

(54) AIR VALVE NOZZLE STRUCTURE FOR INFLATABLE CUSHION

(71) Applicant: CATHAY CONSOLIDATED INC., Yilan County (TW)

(72) Inventor: Hao-Chen Lee, Yilan County (TW)

(73) Assignee: CATHAY CONSOLIDATED INC., Yilan County (TW)

( * ) Notice: Subject to any disclaimer, the term of this patent is extended or adjusted under 35 U.S.C. 154(b) by 0 days.

(21) Appl. No.: 17/965,439

(22) Filed: Oct. 13, 2022

(51) Int. Cl.
   F16K 15/18   (2006.01)
   F16K 15/14   (2006.01)
   F16K 24/00   (2006.01)
   F16K 15/20   (2006.01)

(52) U.S. Cl.
   CPC ........ F16K 15/1825 (2021.08); F16K 15/148 (2013.01); F16K 24/00 (2013.01); *F16K 15/202* (2013.01); *F16K 15/205* (2013.01); *Y10T 137/374* (2015.04)

(58) Field of Classification Search
   CPC ................ F16K 15/202; F16K 15/205; Y10T 137/3857; Y10T 137/3631; Y10T 137/3755; Y10T 137/3786; Y10T 137/5153
   USPC ........................................................... 5/706
   See application file for complete search history.

(56) References Cited

U.S. PATENT DOCUMENTS

| 5,343,889 | A | * | 9/1994 | Jaw | F16K 15/205 137/232 |
| 2008/0223449 | A1 | * | 9/2008 | Culp | F16K 15/205 137/232 |
| 2012/0090699 | A1 | * | 4/2012 | Lau | F16K 15/202 137/231 |
| 2016/0186874 | A1 | * | 6/2016 | Lin | F16K 15/205 137/232 |
| 2017/0241557 | A1 | * | 8/2017 | Xia | F16K 15/144 |
| 2017/0328486 | A1 | * | 11/2017 | Arens | F16K 15/207 |
| 2021/0381611 | A1 | * | 12/2021 | Gaines | F16K 15/148 |

* cited by examiner

*Primary Examiner* — Robert K Arundale
(74) *Attorney, Agent, or Firm* — Chun-Ming Shih; HDLS IPR SERVICES

(57) ABSTRACT

A valve nozzle structure for an inflatable cushion includes an outer body, an inner body, and a diaphragm member. The diaphragm member is assembled in the inner body. The inner body is assembled in the outer body. The valve nozzle structure is able to provide one-way inflation with an automatic check function and deflation. The outer body further includes a holding plate configured to release the sealing state of the diaphragm member. Thus, the valve nozzle structure can achieve an automatic and continuous deflation function. The inner body is detachably connected to the outer body, which is beneficial for maintenance and replacement of the parts.

10 Claims, 8 Drawing Sheets

AIR VALVE NOZZLE STRUCTURE FOR INFLATABLE CUSHION

FIELD OF THE INVENTION

The present invention relates to an air valve nozzle structure, and more particularly to an air valve nozzle structure for an inflatable cushion. The air valve nozzle structure has the advantages of providing inflation and automatic and continuous deflation and easy maintenance.

BACKGROUND OF THE INVENTION

In general, an inflatable cushion is equipped with an air valve nozzle. The air valve nozzle has a non-return diaphragm. When the inflatable cushion is to be inflated, the air pushes the non-return diaphragm away, so that the air can flow into the inflatable cushion. When the inflatable cushion is to be deflated, the user pushes the non-return diaphragm inward with his/her finger to release the non-return sealing effect, so as to create a passageway for exhausting the air in the inflatable cushion. This manual deflation method is quite inconvenient. The deflation process takes time. Prolonged deflation leads to sore hands or sore fingers easily. In the existing products, the non-return diaphragm may be damaged, deformed or hardened after prolonged use. As a result, the non-return sealing function may fail. The conventional one-piece non-return diaphragm cannot be replaced and maintained, so the whole product is scrapped and discarded, which is quite a waste of resources. Most of the existing air valve nozzles are made of a soft plastic material. When the user lies down and turns over on his/her side, it is easy to squeeze and deform the air valve nozzle. This will cause the air valve nozzle to form a crack to result in an unexpected deflation. Accordingly, the inventor of the present invention has devoted himself based on his many years of practical experiences to solve these problems.

SUMMARY OF THE INVENTION

In view of the deficiencies of the prior art, the primary object of the present invention is to provide an air valve nozzle structure for an inflatable cushion. The valve nozzle structure comprises an outer body, an inner body, and a diaphragm member.

Preferably, in an embodiment, the outer body includes a first unit, a second unit, and a connecting unit connected between the first unit and the second unit. The first unit includes an annular body and an annular flange on a top of the annular body. The annular body is a hollow body. A space is defined inside the annular body. At least one engaging block is disposed on an inner surface of the annular body. One side of the second unit has a plug body. The plug body has a multi-layer annular plate on its outer circumferential wall. Another side of the second unit has a protruding seat. An outer side of the protruding seat has a recessed portion. An edge of the recessed portion has two corresponding shaft holes. The recessed portion is configured to receive a holding plate. The holding plate has two shaft members. The two shaft members of the holding plate are pivoted to the shaft holes.

Preferably, in an embodiment, the inner body is detachably disposed in the space of the first unit of the outer body. The inner body is an annular structure. An inner space is defined inside the inner body. A connecting bracket is disposed at a bottom of the inner space. The connecting bracket has a T shape. A through hole is formed in the center of the connecting bracket. A cut-out portion is formed beside the connecting bracket. The cut-out portion is semicircular. An outer circumferential wall of the inner body has a first engaging groove and a second engaging groove. The first engaging groove and the second engaging groove each have an L shape. The first engaging groove and the second engaging groove are selectively engaged with the engaging block of the outer body. A top of the inner body has two first notches, and a bottom of the inner body has two second notches.

Preferably, in an embodiment, the diaphragm member is a circular sheet-like structure. The diaphragm member is configured to cover one end of the inner space of the inner body. A connecting block protrudes outward from the center of a top surface of the diaphragm member. After the connecting block passes through the through hole of the inner body, the diaphragm member is connected to the connecting bracket.

Preferably, in an embodiment, the inner space of the inner body is configured to accommodate the plug body or the protruding seat of the second unit.

Preferably, in an embodiment, an extension piece is disposed on the edge of the second unit of the outer body.

Preferably, in an embodiment, the outer body is made of a relatively soft material, such as TPU (thermoplastic polyurethane), but not limited thereto. The annular flange of the outer body is to be connected with the inflatable cushion.

Preferably, in an embodiment, the inner body is made of a relatively hard material, such as PE (Polyethylene), but not limited thereto. The relatively hard inner body is assembled in the relatively soft outer body, which can provide basic support and comfort and has the advantages of preventing deformation and avoiding air leakage when the inflatable cushion is pressed by an external force.

The air valve nozzle structure provided by the present invention has a special design. The inflation operation is the same as the prior art. When the air is to be deflated, the built-in holding plate is pulled out to push the diaphragm member to release the non-return sealing function, so as to obtain continuous and automatic deflation. Compared with the manual operation to push the non-return diaphragm with a finger for deflation, the present invention is obviously more convenient and has progressiveness.

The air valve nozzle structure provided by the present invention is not a one-piece design. The diaphragm member can be easily removed for repair or replacement. When a part of the air valve nozzle structure is damaged, there is no need to discard the whole inflatable cushion. This can prolong the service life of products, cherish resources and reduce waste.

The air valve nozzle structure provided by the present invention is a multi-piece design. The inner part is made of a relatively hard material, and the outer part is made of a relatively soft material. In this way, the hard internal part can effectively resist deformation when being squeezed by an external force, and prevent air leakage.

BRIEF DESCRIPTION OF THE DRAWINGS

Embodiments of the present invention will now be described, by way of example only, with reference to the accompanying drawings.

DETAILED DESCRIPTION OF THE PREFERRED EMBODIMENTS

Figure 1:
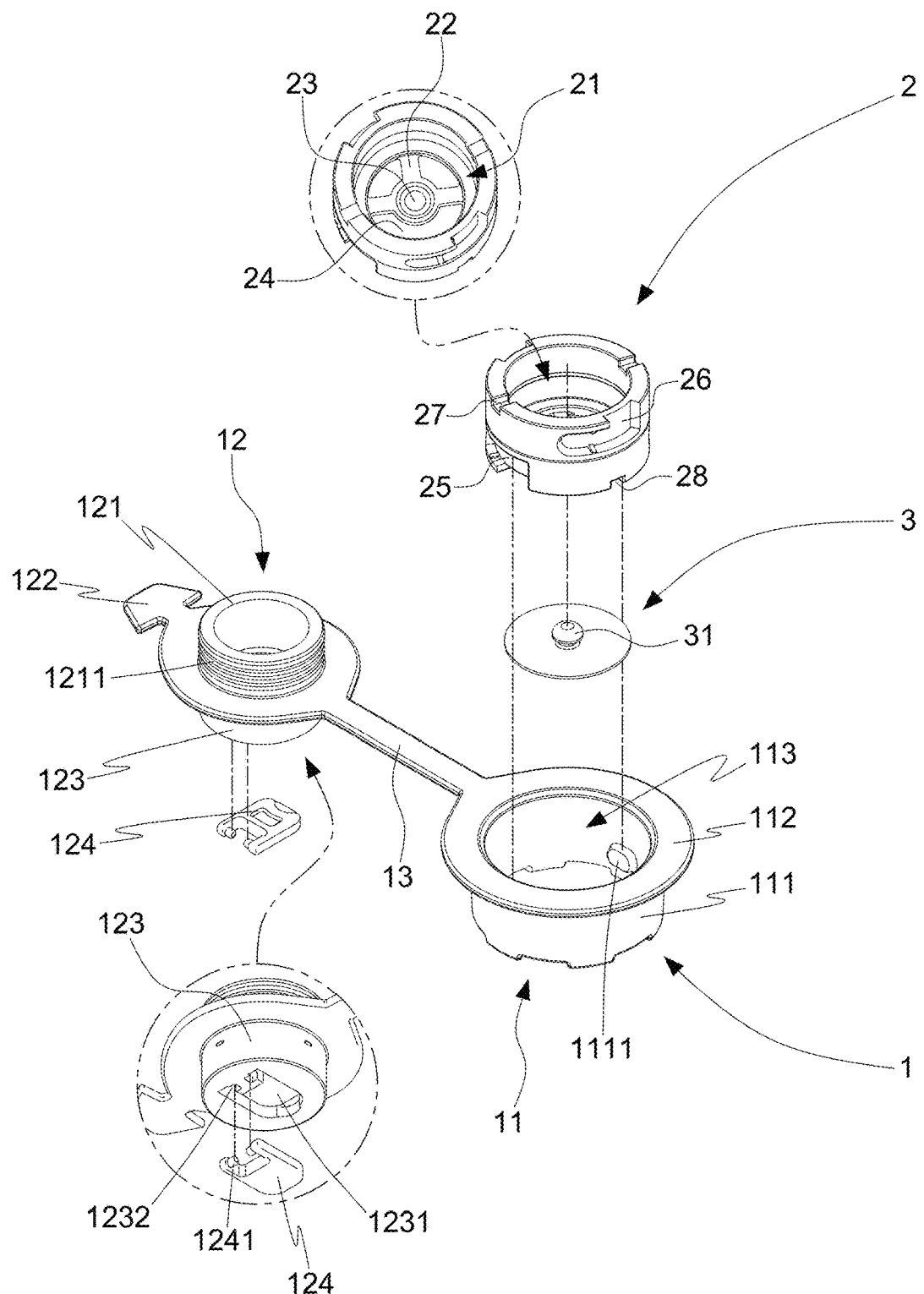
FIG. 1 is an exploded view of the present invention.

As shown in FIG. 1, the present invention discloses an air valve nozzle structure for an inflatable cushion, comprising an outer body 1, an inner body 2 and a diaphragm member 3.

The outer body 1 includes a first unit 11, a second unit 12, and a connecting unit 13 connected between the first unit 11 and the second unit 12. The first unit 11 includes an annular body 111 and an annular flange 112 on the top of the annular body 111. The annular body 111 is a hollow body. A space 113 is defined inside the annular body 111. At least one engaging block 1111 is disposed on the inner surface of the annular body 111. One side of the second unit 12 has a plug body 121. The plug body 121 has a multi-layer annular plate 1211 on its outer circumferential wall. The other side of the second unit 12 has a protruding seat 123. The outer side of the protruding seat 123 has a recessed portion 1231. The edge of the recessed portion 1231 has two corresponding shaft holes 1232. The recessed portion 1231 is configured to receive a holding plate 124. The holding plate 124 has two shaft members 1241. The two shaft members 1241 of the holding plate 124 are pivoted to the shaft holes 1232. An extension piece 122 is disposed on the edge of the second unit 12 of the outer body 1. The outer body 1 is made of a relatively soft material, such as TPU (thermoplastic polyurethane). The annular flange 112 of the outer body 1 is to be connected with the inflatable cushion (not shown in the figure).

The inner body 2 is placed in the space 113 of the first unit 11 of the outer body 1. The inner body 2 is an annular structure. An inner space 21 is defined inside the inner body 2. A connecting bracket 22 is disposed at the bottom of the inner space 21. The connecting bracket 22 has a T shape. A through hole 23 is formed in the center of the connecting bracket 22. A cut-out portion 24 is formed beside the connecting bracket 22. The cut-out portion 24 is semicircular. The outer circumferential wall of the inner body 2 has a first engaging groove 25 and a second engaging groove 26. The first engaging groove 25 and the second engaging groove 26 each have an L shape. The first engaging groove 25 and the second engaging groove 26 are selectively engaged with the engaging block 1111 of the outer body 1. The top of the inner body 2 has two first notches 27, and the bottom of the inner body 2 has two second notches 28. The inner body 2 is made of a relatively hard material, such as PE (polyethylene).

The diaphragm member 3 is circular sheet-like structure. The diaphragm member 3 is configured to cover the inner space 21 of the inner body 2. A connecting block 31 protrudes outward from the center of a top surface of the diaphragm member 3. After the connecting block 31 passes through the through hole 23 of the inner body 2, the diaphragm member 3 is positioned at the outer side of the connecting bracket 22 of the inner body 2.

Figure 2:
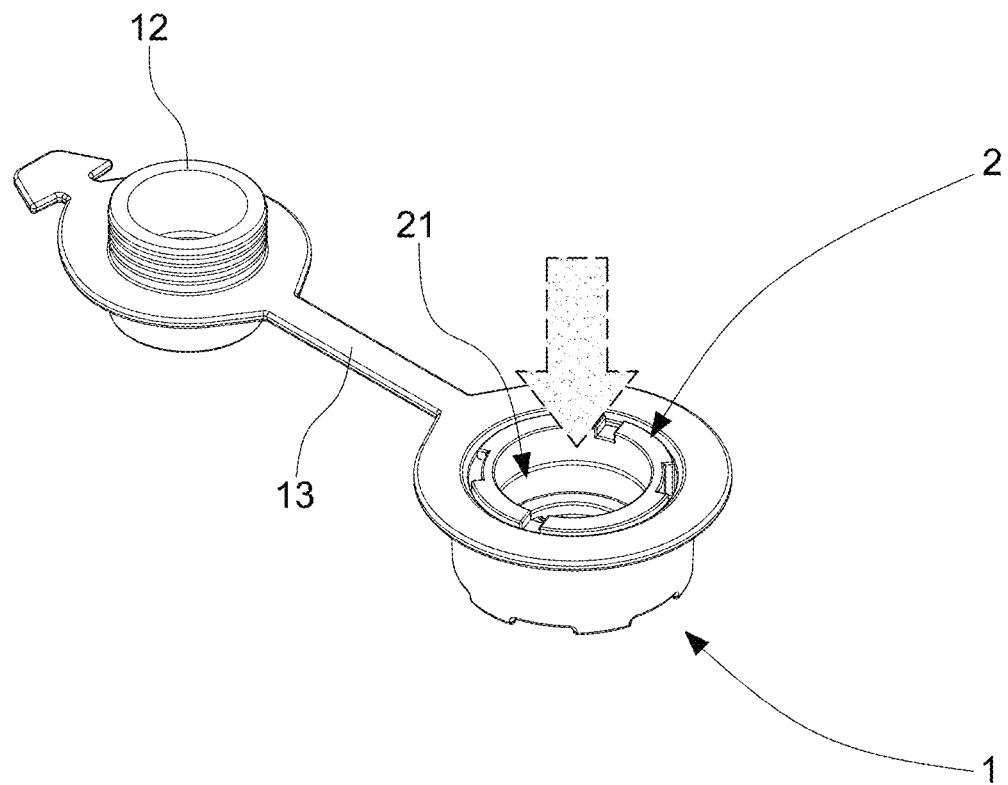
FIG. 2 is a schematic view of the present invention, wherein the inner body is placed in the outer body.
Figure 3:
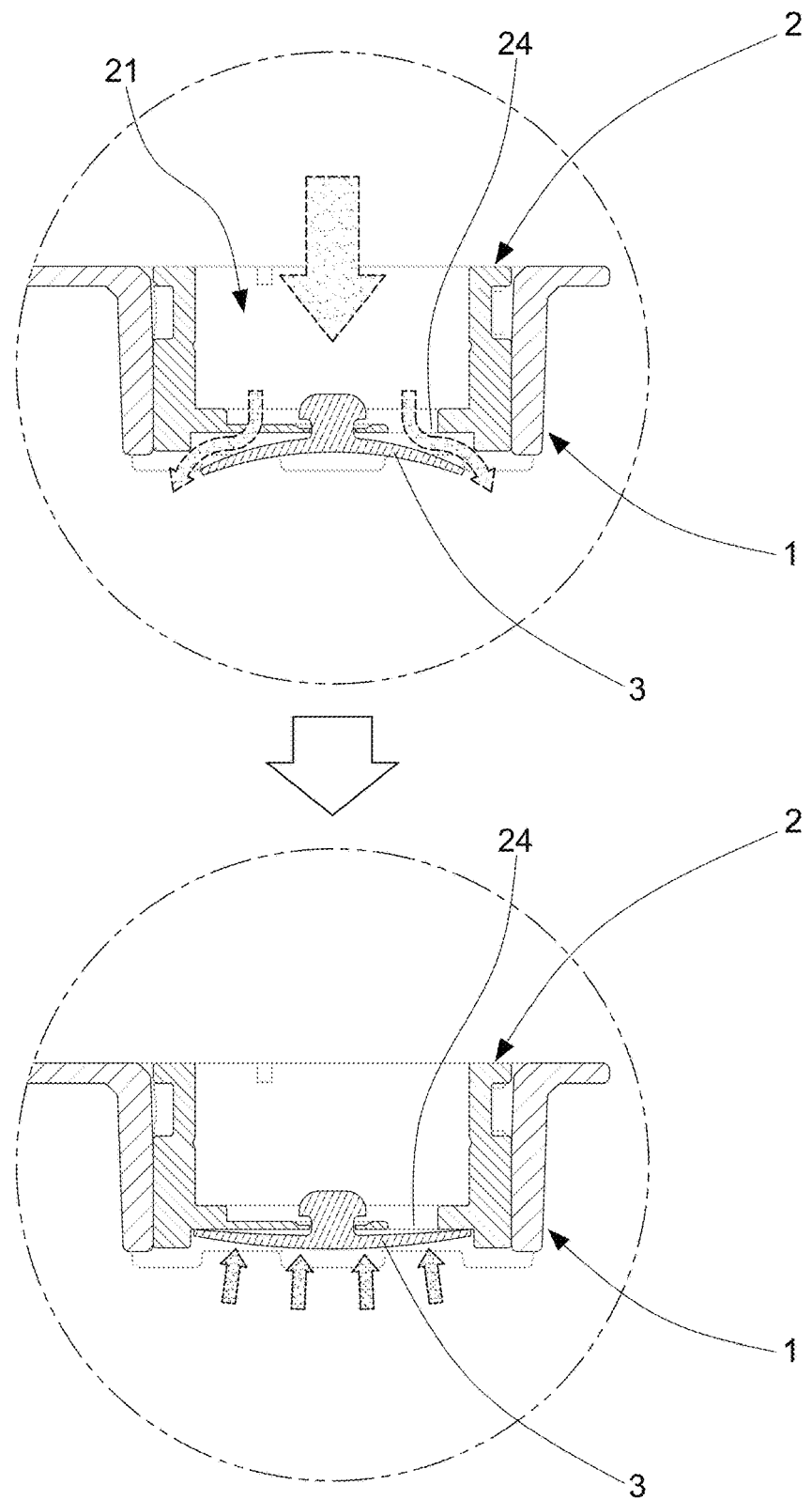
FIG. 3 is a schematic view of the present invention, showing the non-return operation after the inflation is completed.
Figure 4:
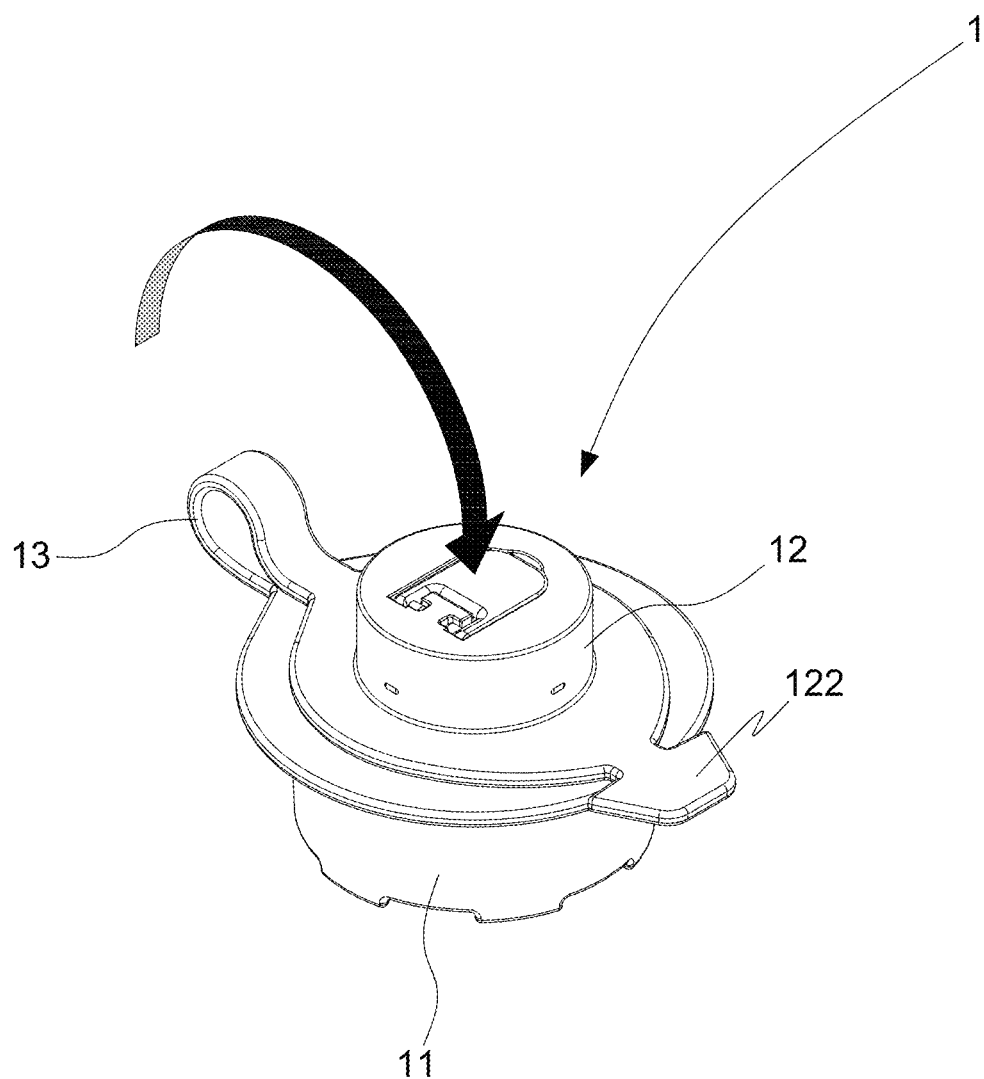
FIG. 4 is a schematic view of the present invention, showing that the outer body is closed after the inflation is completed.

When the present invention is to be implemented, referring to FIG. 2, the second unit 12 of the outer body 1 is removed from the first unit 11, so that the diaphragm member 3 is located at the bottom of the inner body 2. Then, the inner body 2 is placed into the space 113 of the outer body 1. The inner body 2 is slightly rotated for the engaging block 1111 to be engaged in the first engaging groove 25, so that the inner body 2 is positioned and combined with the outer body 1. When the inflatable cushion is to be inflated, referring to FIG. 3, the air is poured from the top of the outer body 1 towards the diaphragm member 3. Because the connecting block 31 of the diaphragm member 3 is connected to the outer side of the connecting bracket 22, there is no object blocking the annular edge of the diaphragm member 3. The air pushes the diaphragm member 3 and passes through the passageway at the edge of the diaphragm member 3, so as to inflate the inflatable cushion. The air in the inflatable cushion will automatically push the diaphragm member 3 back to its original position when there is no more air entering from the outside of the diaphragm member 3, in cooperation with the air pressure inside the inflatable cushion, thereby obtaining a non-return closed state. After the inflation is completed, referring to FIG. 4, the plug body 121 of the second unit 12 is inserted into the inner space 21 of the inner body 2, in cooperation with the multi-layer airtight configuration of the annular plate 1211, to provide an excellent airtight effect. In the present invention, the relatively hard inner body 2 is assembled in the relatively soft outer body 1, which can provide basic support and comfort and has the advantages of preventing deformation and avoiding air leakage when the inflatable cushion is pressed by an external force.

Figure 5:
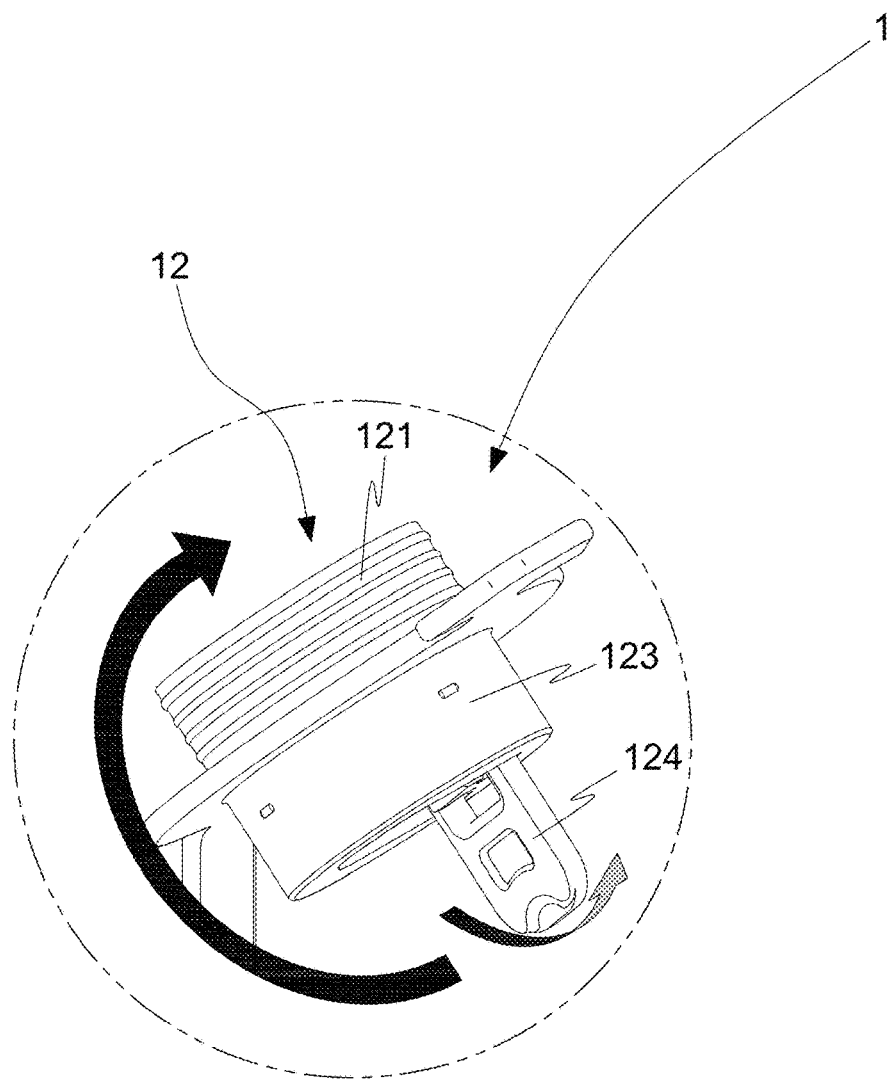
FIG. 5 is a schematic view of the present invention, showing that the second unit is overturned and the holding plate is pulled out to facilitate deflation.
Figure 6:
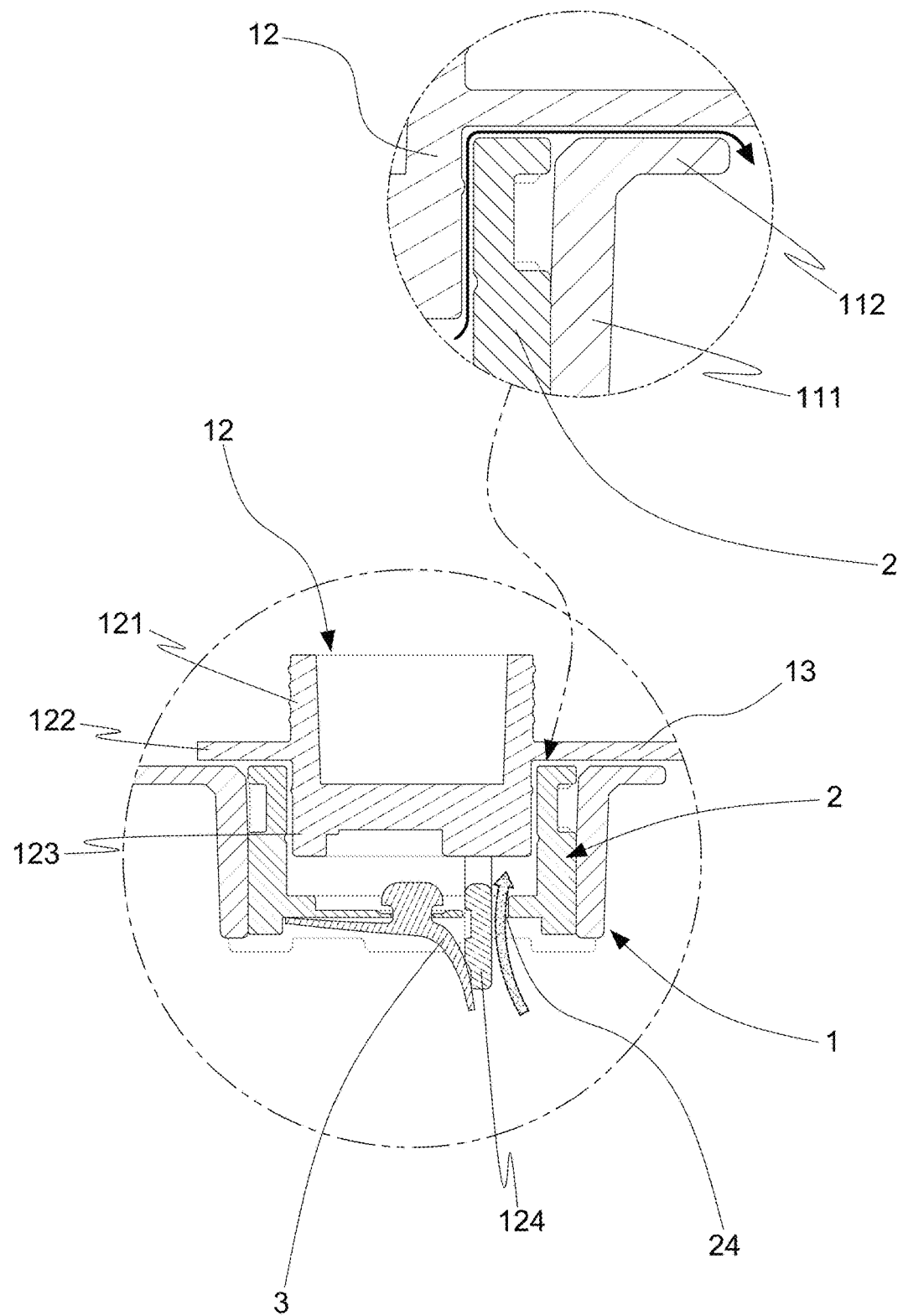
FIG. 6 is a schematic view of the present invention, showing that the holding plate is inserted in the cut-out portion for performing deflation.

When the inflatable cushion is to be deflated and folded, the extension piece 122 is pulled out, so as to pull out the second unit 12. Next, the second unit 12 is overturned for the recessed portion 1231 to face the first unit 11, referring to FIG. 5. Then, the holding plate 124 is turned outward, and the protruding seat 123 is inserted into the inner space 21 of the inner body 2. The end of the holding plate 124 passes through the cut-out portion 24 and supports the diaphragm member 3 to deform it, thereby generating a passageway, referring to FIG. 6. In this way, the air in the inflatable cushion can be automatically discharged to the outside due to the pressure difference via the gap between the inner body 2 and the protruding seat 123, so as to achieve automatic and continuous deflation.

Figure 7:
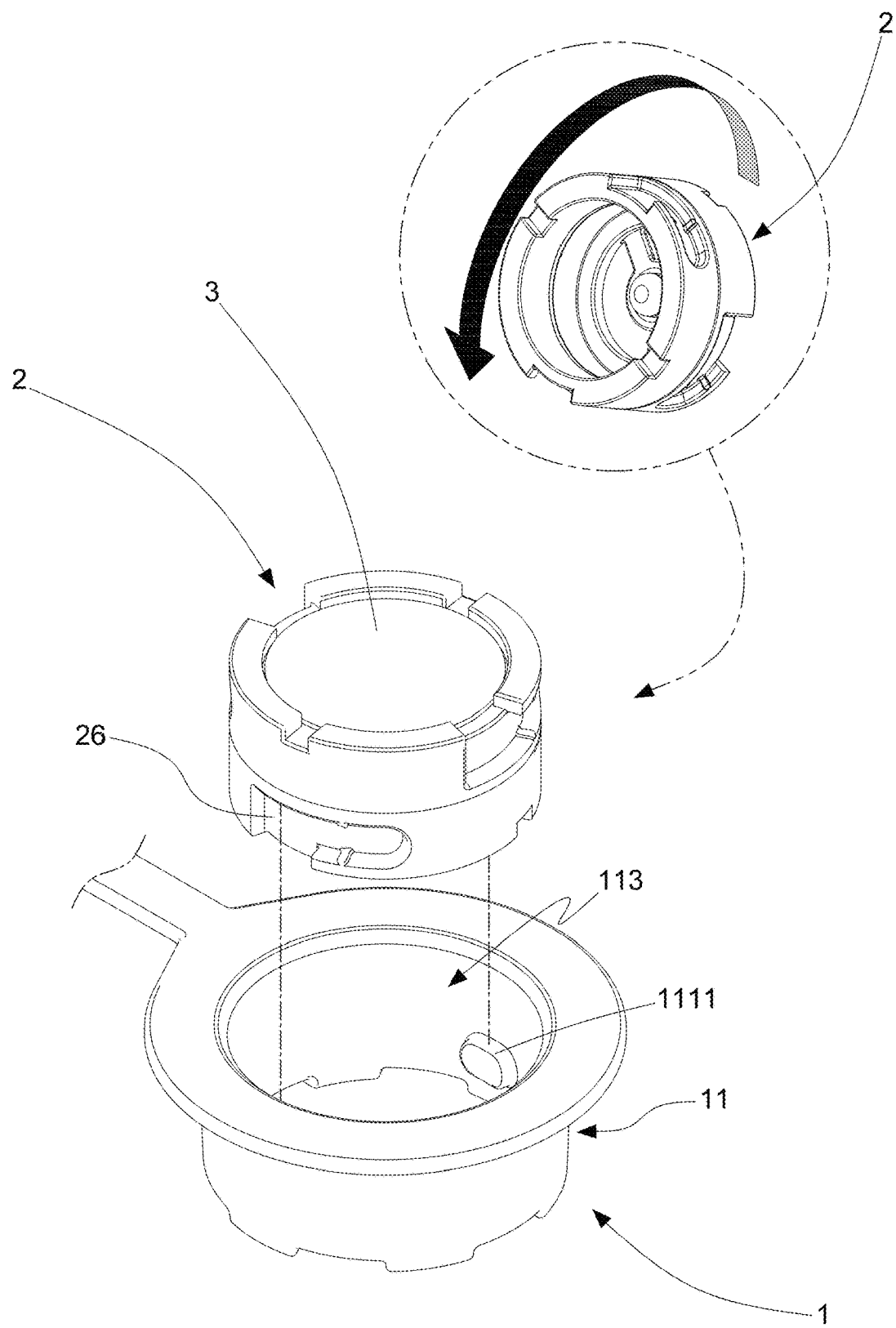
FIG. 7 is a schematic view of the present invention, showing that the inner body is overturned to facilitate deflation.
Figure 8:
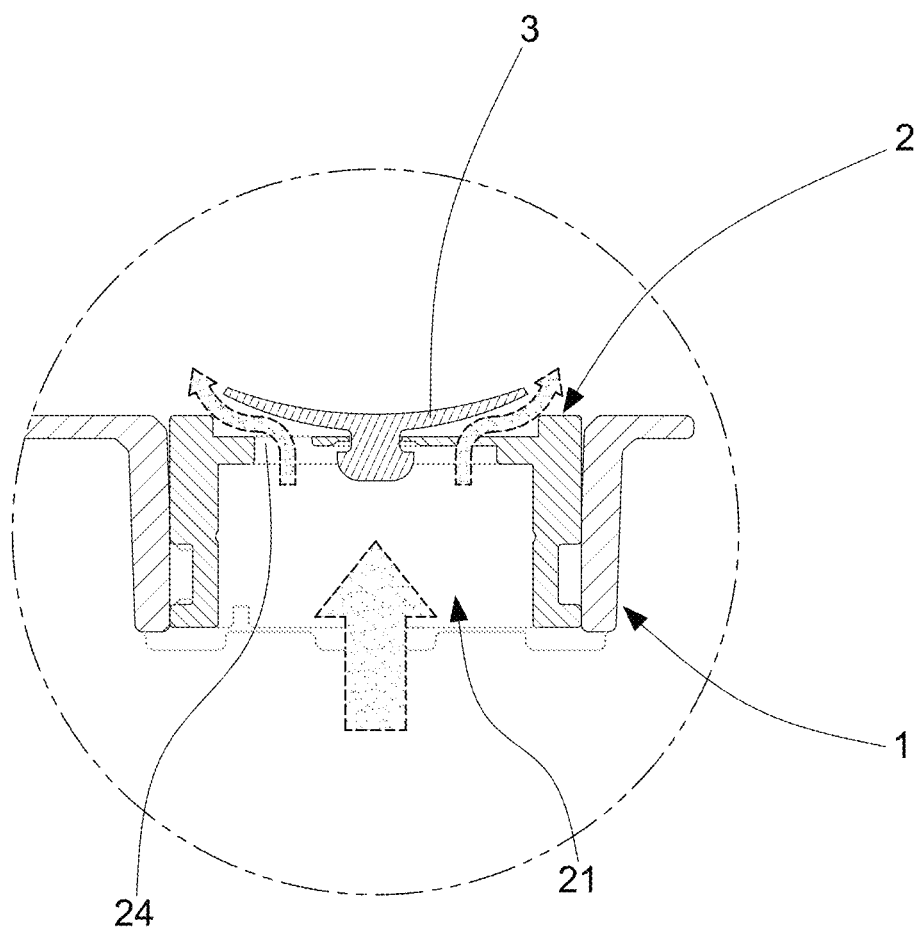
FIG. 8 is a cross-sectional view of the present invention, showing that the inner body is overturned to facilitate deflation.

In the design of the present invention, because the inner body 2 and the outer body 1 are in a combined relationship, two first notches 27 are arranged on the top of the inner body 2. The inner body 2 can be easily taken out by inserting a coin (not shown in the figure) between the two first notches 27. On the one hand, the diaphragm member 3 can be easily repaired and replaced with a new one when it is damaged; on the other hand, the inner body 2 can be turned over for use through the design of the second engaging groove 26 of the inner body 2. As shown in FIG. 7 and FIG. 8, the diaphragm member 3 of the inner body 2 is located at the top and the inner body 2 is placed in the space 113 of the first unit 11. The diaphragm member 3 can provide a deflation function when the inflatable cushion is rolled up without using the holding plate 124.

What is claimed is:

1. An air valve nozzle structure for an inflatable cushion, comprising:
   an outer body, including a first unit, a second unit and a connecting unit connected between the first unit and the second unit; the first unit including an annular body, the annular body being a hollow body, a space being defined inside the annular body; one side of the second unit having a plug body, another side of the second unit having a protruding seat opposite to the plug body, a holding plate being disposed on an outer side of the protruding seat;
   an inner body, detachably disposed in the space of the first unit of the outer body; the inner body being an annular structure, an inner space being defined inside the inner body, a connecting bracket being disposed at a bottom of the inner space; a cut-out portion being formed beside the connecting bracket;
   a diaphragm member, being a circular sheet-like structure, the diaphragm member being configured to cover the inner space of the inner body; a central portion of the diaphragm member being connected to the connecting bracket.

2. The air valve nozzle structure as claimed in claim 1, wherein the first unit further includes an annular flange on a top of the annular body.

3. The air valve nozzle structure as claimed in claim 1, wherein at least one engaging block is disposed on an inner surface of the annular body.

4. The air valve nozzle structure as claimed in claim 3, wherein an outer circumferential wall of the inner body has a first engaging groove and a second engaging groove, the first engaging groove and the second engaging groove each have an L shape, and the first engaging groove and the second engaging groove are selectively engaged with the engaging block of the outer body.

5. The air valve nozzle structure as claimed in claim 1, wherein the plug body has a multi-layer annular plate on an outer circumferential wall thereof.

6. The air valve nozzle structure as claimed in claim 1, wherein the outer side of the protruding seat has a recessed portion, an edge of the recessed portion has two corresponding shaft holes, the recessed portion is configured to receive the holding plate, the holding plate has two shaft members, and the two shaft members are pivoted to the shaft holes.

7. The air valve nozzle structure as claimed in claim 1, wherein the connecting bracket has a T shape, a through hole is formed in a center of the connecting bracket, a connecting block protrudes outward from a center of a top surface of the diaphragm member, and the connecting block is connected to the through hole.

8. The air valve nozzle structure as claimed in claim 1, wherein a top of the inner body has two first notches, and a bottom of the inner body has two second notches.

9. The air valve nozzle structure as claimed in claim 1, wherein an extension piece is disposed on an edge of the second unit of the outer body.

10. The air valve nozzle structure as claimed in claim 1, wherein the outer body is made of TPU (thermoplastic polyurethane), and the inner body is made of PE (polyethylene).

* * * * *